March 5, 1963 H. RUDOLPH ET AL 3,080,452

SYNCHRONOUS COMMUNICATION SYSTEMS

Filed Jan. 15, 1960 2 Sheets-Sheet 1

Inventors
HANS RUDOLPH
ALFRED SCHELLING

By Toulmin & Toulmin
Attorneys

Inventors
HANS RUDOLPH
ALFRED SCHELLING

By Toulmin & Toulmin
Attorneys

United States Patent Office 3,080,452

Patented Mar. 5, 1963

3,080,452

SYNCHRONOUS COMMUNICATION SYSTEMS

Hans Rudolph, Munich-Solln, and Alfred Schelling, Munich, Germany, assignors to Siemens & Halske, Aktiengesellschaft, Berlin, Germany, a company of Germany Filed Jan. 15, 1960, Ser. No. 2,699
Claims priority, application Germany Jan. 19, 1959
11 Claims. (Cl. 178—69.5)

Figure 1:
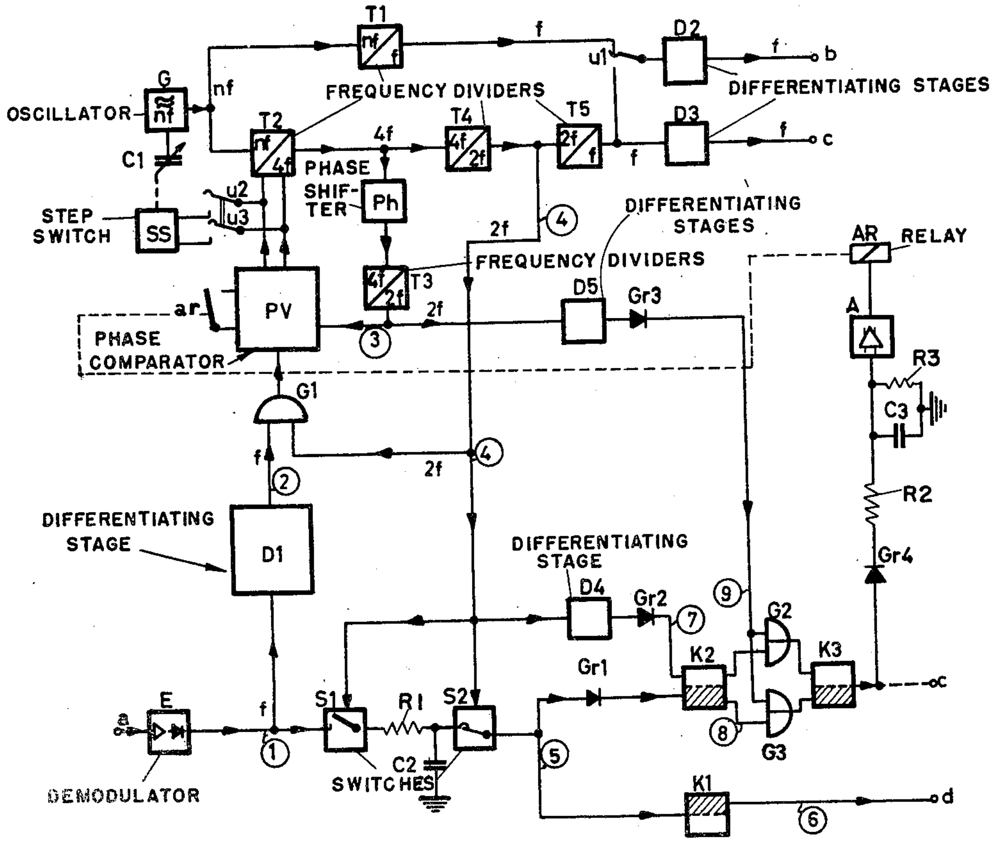

This invention relates to synchronous communication systems in which the transmitting and receiving apparatuses run continuously and are closely controlled in speed and phase by special means.

It is an object of the invention to provide a method of synchronising a receiver to a transmitter in a synchronous transmission system including the step of interrupting the synchronising operation when the received signals are disturbed by more than a predetermined amount.

It is an object of another aspect of the invention to provide synchronising apparatus for synchronising a receiver to a transmitter in a synchronous transmission system, including interrupting apparatus to interrupt the synchronising operation when the received signals are disturbed by more than a predetermined amount.

It is an object of another aspect of the invention to provide a synchronous transmission system including a transmitter, a receiver and synchronising apparatus for synchronising the receiver to the transmitter in a synchronous transmission system, including interrupting apparatus to interrupt the synchronising operation when the received signals are disturbed by more than a predetermined amount.

It is an object of yet another aspect of the invention to provide a receiving system including a receiver capable of receiving signals from a transmitter in a synchronous transmission system and synchronising apparatus for synchronising the receiver to the transmitter in a synchronous transmission system, including interrupting apparatus to interrupt the synchronising operation when the received signals are disturbed by more than a predetermined amount.

The transmission is often over paths which are liable to cause unwanted disturbances of the transmitted signals. One such path is a short wave radio path.

In the following description, when a signal is referred to as having been disturbed, it will be understood that the terms "disturbed" or "disturbance" include phase displacement and amplitude variation having as one limit the case where the amplitude is zero.

Correct phase synchronism as used herein is to be understood to mean that the speed of operation of the receiving device, which may be a receiving distributor, is at least coarsely adjusted so that the individual pulses are correctly combined together into complete code signals and that in multiplex operation the received signals are correctly distributed to the various channel receivers to which they belong.

Synchronous transmission is often used in teleprinter systems operating over paths which are liable to disturbances instead of the more normal start-stop system which is used on paths less liable to disturbances.

In synchronous systems in general the speed of operation of the transmitting and receiving devices is normally controlled by high-stability oscillators. However it is not possible, after adjustment, to maintain the correct phase-synchronism between the transmitting and receiving devices for any length of time by means only of the stability of the oscillator. Variations in the travelling time over the transmission path and small frequency differences of the control oscillators in the transmitter and receiver slowly lead to phase errors which must be corrected in order to ensure correct reception.

If the period during which an individual received pulse step is scanned by the sampling pulse is shorter than the received pulse duration, a certain time tolerance is permissible for the sampling process. However the sampling process must occur only within the duration of the pulse to be sampled and must not wander to the preceding or to the subsequent pulse. In order that the permissible tolerance may be reserved as far as possible for the unavoidable travelling time variations on the transmission path, the telegraphy distortions and for any possible fluctuations in the speed of operation, the sampling process is maintained as far as possible in the centre of the nominal time duration of a pulse. The position of the sampling pulse within the time duration of a received pulse is denoted herein as the sampling position.

The sampling position of the receiving device may be shifted forwards or backwards when a phase error has accumulated. In order to compare the phase of the transmitter and receiver the start of the received signal (the beginning of a pulse) may be used and suitable synchronising signals, for example pulses, derived from it. Alternatively special periodic synchronising signals may be sent out by the transmitter in addition to the message signals and these are separated from the message signals in the receiver. In general individual synchronising pulses are not used for phase correction, since on account of the unavoidable telegraphy distortions arising in the apparatus and on the transmission path, individual synchronising signals may vary about a central position in time. Phase correction is therefore normally carried out only when the phase position, averaged over a comparatively long period of time, of the synchronising signals shows a phase error.

If it is found that the phase corrections over a period of time are mainly in the same direction (shifting forwards or backwards), it is an indication that the frequency of the receiver control oscillator does not agree exactly with that of the transmitter control oscillator. With each phase correction or after forming a mean value of a plurality of phase corrections, the frequency of the receiver control oscillators may be readjusted by a very small amount. After many such frequency readjustments the frequency of the receiver control oscillator will then agree substantially exactly with the frequency of the transmitter control oscillator.

When high-stability control oscillators are used this method has the great advantage that the sampling of the received signal always occurs at the correct position even after a total interruption of the transmission path lasting many minutes or even several hours and a further adjustment is unnecessary. The transmission can continue immediately after the end of the interruption and if the synchronous system is fitted with a device for automatic error correction which causes the transmitter to repeat the disturbed signal the transmission is automatically continued without losing a single message signal.

It may frequently happen, for example, when the transmission path is a short wave radio path, that message reception is interrupted or is strongly disturbed by adverse transmission conditions. The radio receiver then may interpret the input mush and the unwanted voltages introduced due to atmospheric conditions as including synchronising signals. The phase correction device responds to these synchronising signals and may operate to alter the phase synchronism of the transmitter and receiver which had been correctly adjusted during the previous good reception. The alteration may even be so large that succeeding messages are incorrectly received, which is an obvious disadvantage.

From one aspect it is an object of the present invention to provide a method of synchronising a receiver to a transmitter in a synchronous transmission system in which the above-mentioned disadvantage is substantially reduced or obviated. According to this aspect the invention consists in a method of synchronising a receiver to a transmitter in a synchronous transmission system, including the step of interrupting the synchronising operation when the received signals are disturbed by more than a predetermined amount.

From another aspect it is an object of the invention to provide synchronising apparatus for synchronising a receiver to a transmitter in a synchronous transmission system in which the above-mentioned disadvantage is substantially reduced or obviated. According to this aspect the invention consists in synchronising apparatus for synchronising a receiver to a transmitter in a synchronous transmission system including means for utilising synchronous information received by the receiver to initiate a synchronising operation and apparatus to interrupt the synchronising operation when the received signals are disturbed by more than a predetermined amount.

From yet another aspect of the invention it is an object to provide a synchronous transmission system which does not suffer from the above-mentioned disadvantage. From this aspect the invention consists in a synchronous transmission system including a transmitter, a receiver and synchronous apparatus for synchronising the receiver to the transmitter comprising means for utilising synchronous information received by the receiver to initiate a synchronising operation and apparatus to interrupt the synchronising operation when the received signals are disturbed by more than a predetermined amount.

From a further aspect of the invention it is an object to provide a receiving system which does not suffer from the above-mentioned disadvantage. From this aspect the invention consists in a receiving system including a receiver capable of receiving signals from a transmitter in a synchronous transmission system, and synchronising apparatus for synchronising the receiver to the transmitter comprising means for utilising synchronous information received by the receiver to initiate a synchronising operation and apparatus to interrupt the synchronising operation when the received signals are disturbed by more than a predetermined amount.

Figure 2:
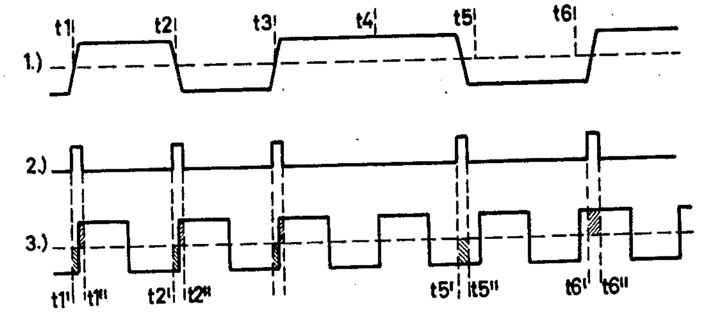
Figure 3:
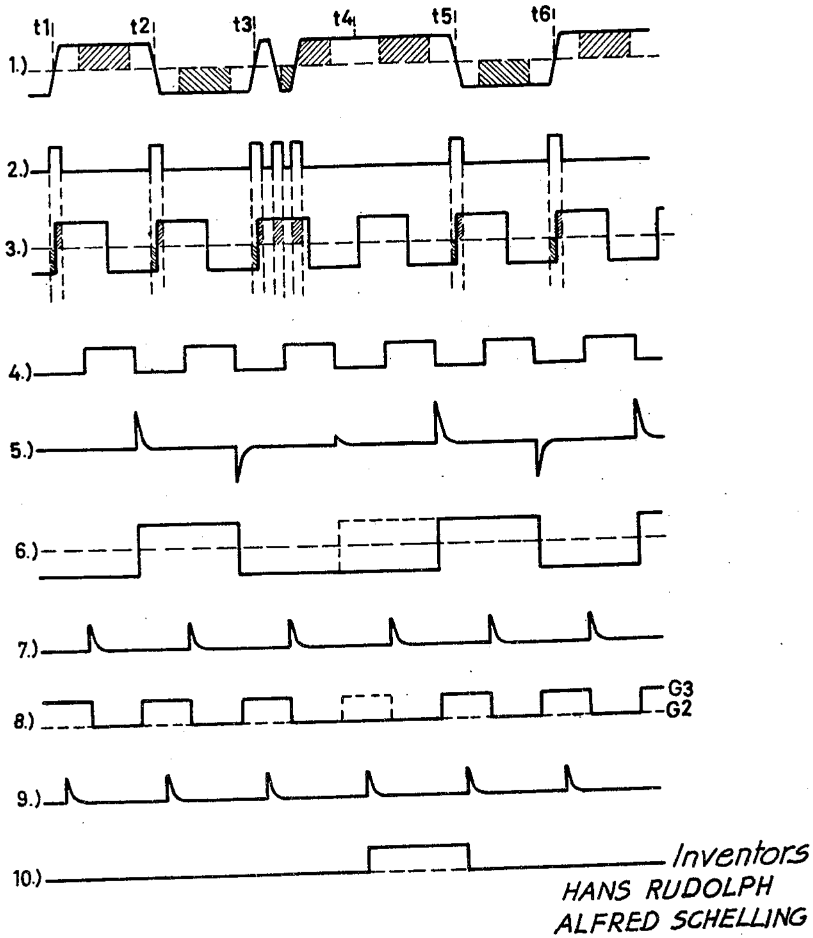

Some embodiments of the invention will now be described, by way of example, with reference to the accompanying drawings in which:

FIGURE 1 is a diagrammatic representation of part of a synchronous transmission system according to the invention;

FIGURE 2 diagrammatically illustrates some of the fundamental pulse wave forms encountered in a synchronous transmission system; and FIGURE 3 diagrammatically illustrates the waveforms which appear at various points in FIGURE 1.

In FIGURE 1 the telegraphy signals arrive at an input terminal *a* in the form of a modulated carrier frequency voltage. They are then amplified in a demodulator device E and are converted into direct current signals having a step sequence frequency *f* and at the output of E they are in the form illustrated in FIGURE 2 line 1. Due to travel over the transmission path, the leading and trailing edges of the pulses depart from their original form and their rise time increases. For simplification purposes they have been shown as linear in FIGURE 2. The instants (time reference points) at which the pulses start when reception is undisturbed and the phase-synchronism is correct in relation to the time position of the sampling pulse are identified in line 1 of FIGURE 2 as *t*1 to *t*6.

In the following description it will be appreciated that it is immaterial whether the telegraphy pulse steps illustrated form part of a single telegraphy message or whether they form part of different messages, the pulses or pulse combinations of which occur alternately in a time-division multiplex system.

The direct current signals delivered by the demodulation device E (FIGURE 1) are fed to a differentiating circuit D1 which derives, from their leading edges, pulses having a good rectangular shape and pulse duration. The circuit D makes them all of the same polarity, for example positive polarity, by means of a rectifying device. These pulses are used as synchronising signals and are illustrated at line 2 of FIGURE 2.

A high stability crystal-controlled oscillator G (FIGURE 1) delivers an output at a control frequency *nf* to a frequency divider T1. This delivers synchronising pulses at a frequency *f* through the change-over contact *u*1 to a differentiating and amplifying unit D2 which supplies a suitable synchonising pulse having the pulse sequency *f* to the output terminal *b*. This synchronising pulse is used for the control of a transmission device (not shown), for example a multiplex transmission distributor. Frequency dividers T2, T4 and T5 subdivide the frequency of the control oscillator to provide pulses at the frequency *f* to a differentiating and amplifying unit D3 which forms therefrom a suitable synchronising pulse for controlling the revolution of the receiver device, which may be a multiplex receiver distributor, through an output terminal *c*. The frequency divider T2 may be controlled by the receiver device (in a manner to be explained) and therefore the synchronising pulses delivered by the differentiating and amplifying units D2 and D3 are not locked in their phase relationship to each other. When a phase correction is made the transmitter and receiver devices should not be phase-locked to each other; this is ensured by the position of a contact *u*1 of a change-over switch U (not shown).

The frequency divider T2, which divides down to a frequency 4*f*, delivers a voltage through a phase shifter P*h* to a frequency divider T3 which itself delivers a rectangular alternating voltage (FIGURE 2 line 3) of a frequency 2*f* and a suitable phase relationship to the synchronising pulses due to the phase shifter P*h*.

An essential part of the synchronising device is in the phase comparison device PV (FIGURE 1); to this are applied on the one hand through an AND gate circuit G1, which may at first be regarded as continuously conductive, the synchronising pulses which are supplied by the differentiating circuit D1, on the other hand a voltage of rectangular waveform frequency 2*f* is supplied by the frequency divider T3. The synchronising process is in short as follows:

A synchronising pulse which occurs for example at the instant *t*1 (FIGURE 2, line 2) closes a switch, preferably electronic, for a short period from *t*1′ to *t*1″, and this causes a rectangular alternating voltage (FIGURE 2, line 3) delivered by T3 to be applied through a resistor (not shown) but in the phase comparator PV) to a capacitor C (not shown, but in the phase comparator PV). Since the voltage of the frequency divider T3 at the instant *t*1′ is negative the capacitor C starts to charge negatively; after approximately half the period of closure of the switch the rectangular voltage reverses polarity in a positive direction; the charging current of the capacitor C therefore flows in the opposite direction. If the capacitor C is charged negatively and positively for equal periods during the time duration of a synchronising pulse, that is during the closure time of the switch, the resultant charge on the condenser at the end of the closure time, i.e. at the instant *t*1, is zero.

However, if the synchronising pulses arrive too early, each one gives the capacitor a residual negative charge. The charges add together and when the total charge reaches a predetermined value the synchronising device causes the frequency divider T2 to be controlled so that it jumps one division and gives an output one division earlier. Simultaneously the capacitor C is discharged by being short circuited through a further switch which is preferably electronic. Since the additional division occurs at the higher frequency $nf$ it only results in a single small phase change of magnitude $$\frac{\pi}{n}$$

in the pulses at the frequency $f$. The pulses at the comparison frequency $2f$ delivered by the frequency divider T3 undergo a phase change of twice as much, but in time it represents the same small amount. In order to correct a significant phase error the process must be repeated several times. If the switch U (not shown) is operated at the receiver station contacts $u2$ and $u3$ are closed and therefore, simultaneously with the initiation of the additional division change, one of the magnets of a step switch arrangement SS is excited, and this works through a pawl upon a tooth wheel and rotates a trimmer capacitor C1 of the control crystal in the control oscillator. This capacitor is rotated a small amount through reduction gearing in a direction to cause an increase of the control frequency.

In FIGURE 2 the start of each of the first three pulses is undistorted and therefore coincides with a time reference point and is in the correct phase position. The start of the fourth pulse (instant $t4$) is not effective as one positive pulse follows another positive pulse and consequently no leading or trailing edge is present. The start of the fifth pulse arrives before reference instant $t5$ and the start of the sixth pulse arrives after the instant $t6$. The above-mentioned capacitor C therefore receives a negative charge during the time interval of the derived synchronising pulse ($t5'$ to $t5''$). However this is cancelled in the time interval of the following belated synchronising pulse ($t6'$ to $t6''$) by a positive charge. These are not genuine phase errors, but are produced because the signals have been subjected to telegraphy distortion. Since no residual charge remains on the capacitor C during the average of the two starts of the pulses no correction process is initiated.

In FIGURE 3, line 1 shows a similar pulse sequence to that of line 1 in FIGURE 2. However it has been assumed here that the positive pulse lying between the intervals $t3$ and $t4$ reverses temporarily in negative direction because of a disturbance. Line 2 in FIGURE 3 shows that through this disturbance two additional (false) synchronising pulses are generated. These cause additional positive charges to be applied to capacitor C in the phase comparison device PV (FIGURE 1) (compare line 3 in FIGURE 3) and if the disturbances accumulate these may cause a multiple response of the phase correction and therefore also of frequency readjustment whereby the previously correct synchronism of the receiving device is altered.

From the output of the frequency divider T4 a rectangular voltage (line 4 in FIGURE 3) is taken. Its switching frequency is $2f$ and it is used for operating two switches S1 and S2 (FIGURE 1). These are preferably electronic switches. The switch S1 is always closed later than the time reference point ($t1$, $t2$ . . . ) of each pulse by a time equal to 25% of a pulse duration of the received signals (line 1, FIGURE 3); simultaneously the switch S2 is opened. The switch S1 is closed for about half a pulse width in the present example; its termination is therefore 25% of a pulse width before the start of the next following pulse. As long as S1 is closed a current flows from the demodulator device E through the resistor R1 into the capacitor C2 and charges it positively or negatively according to the polarisation of the signal voltage received. In this way the received signal pulses are scanned in their middle region (shaded areas in FIGURE 3, line 1). The start and end regions of the steps (in the present example one quarter each of the nominal pulse width) is not evaluated, because these regions are usually distorted by unavoidable telegraphy disturbances.

After the termination of the scanning time the switch

S1 opens. At this instant the switch S2 closes and discharges the capacitor C2. If the discharge pulse (line 5 in FIGURE 3) has a sufficient magnitude it switches a bi-stable flip-flap circuit K1 into the position which corresponds to its polarisation (line 6 in FIGURE 3). Since the pulse received between the intervals $t3$ and $t4$ is ambiguous in its polarisation because of the disturbance and has left only a small residual charge on the capacitor during scanning, the resultant discharge pulse (line 5) is so small that it is insufficient for switching over the bi-stable circuit K1.

From the output of the bi-stable circuit K1 the newly formed telegraphy signals, which may contain falsified pulses under certain circumstances (line 6), are transferred through the terminal $d$ to the receiving device, for example a multiplex distributor. If automatic error correction is provided a faulty signal is recognised and the error is removed by repetition of the disturbed signal as a result of automatic back enquiry at the transmitter.

The discharge pulses of the capacitor C2 are also rectified by means of a rectifier arrangement Gr1 and are applied to a bi-stable flip-flap circuit K2. A differentiating circuit D4 forms pulses from the rectangular voltage from the frequency divider T4, the negative pulses being suppressed and the positive pulses (line 7, FIGURE 3) applied to the bi-stable circuit K2. The bi-stable circuit K2 is thus controlled by the pulses of lines 5 and 7 (FIGURE 3) and thereby switches alternately into the one or the other position (line 8 in FIGURE 3). If the magnitude of a pulse of line 5 is insufficient the switching of K2 does not take place.

Each of the two outputs of the bi-stable circuit K2 carrying opposing voltages is connected to a separate input of a bi-stable circuit K3 through the OR gate circuits G2 and G3. Moreover pulses which are derived from the output voltage (line 3 in FIGURE 3) of the frequency divider T3 by means of the differentiating circuit D5 are also applied to these gate circuits. A rectifier Gr3 ensures that only the positive pulses (line 9 in FIGURE 3) are applied to the gates. In normal operation when reception is good, at the time of arrival of a positive pulse from Gr3, only the gate G3 is rendered operable by the voltage from the bi-stable circuit K2. The bi-stable circuit K3 is thereby kept in its rest position. If, however, due to a disturbance in reception, the bi-stable stage K2 has not been switched by a pulse from Gr1 the gate G2 is rendered operable and the gate G3 is rendered inoperable (approximately in the centre of line 8 in FIGURE 3). Thus the bi-stable circuit K3 will respond at this instant (line 10 in FIGURE 3). If in the meantime no further disturbed signal pulse is received, G3 is rendered operable again at the instant of the next following pulse; the bi-stable circuit K3 therefore switches back again into its rest position. The bi-stable circuit K3 consequently delivers a current to a capacitor C3 through a rectifier Gr4 and a resistor R2 for each uncertain signal pulse. The capacitor therefore receives only a small charge which leaks slowly away again through the high resistance R3 if the reception is good. If faulty signal pulses are received very frequently or continuously the charge on the capacitor C3 builds up. As soon as it reaches a predetermined magnitude the resultant capacitor charge voltage, after amplification in an amplifier A, causes a relay AR to respond. The contact $ar$ (FIGURE 1) of relay AR affects the phase comparison device PV, or another part of the synchronising device in such a way that a (false) synchronising process is prevented. For example the capacitor C which is contained in the phase comparison device PV may be short-circuited through the contact $ar$. Obviously AR may be constructed as an electronic relay.

In a further embodiment of the present invention the rectangular voltage which is taken off the output of the frequency divider T4 for the gate G3 is first inverted so that it is oppositely polarised to the rectangular voltage of line 4 in FIGURE 3 which is delivered by the frequency divider T4 to the frequency divider T5. Thus gate circuit G1 is rendered operable at a point in time which is 25% of a pulse width before the instant at which a synchronising pulse is to be expected when the reception is free from distortion. It is rendered inoperable again at a point in time which is approximately 25% of a pulse width after this instant. In this way all synchronising pulses which are produced when the telegraphy distortion exceeds the limit of 25% do not affect the synchronising process and cannot do any damage. It is, of course, advisable that the limit is temporarily removed when phasing-in prior to putting the system into operation.

It will be appreciated that the invention is applicable to synchronous transmission systems which operate electromechanically as well as to those which are purely electronic.

What we claim as our invention and desire to secure by Letters Patent of the United States is:

1. Synchronising apparatus for synchronising a receiver to a transmitter in a synchronous transmission system including a control device to deliver a control frequency to the receiver, means for modifying said control frequency, comparator means to compare the received signals and said control frequency and to control the modifying means to maintain the receiver in synchronism with the transmitter, a capacitor to which part of each received pulse is fed during a predetermined time interval, the resultant charge on the capacitor being indicative of the amount by which the respective received pulse has been disturbed, a two-state device capable of assuming either of two states and responsive to the charge on the capacitor to adopt one stable state when the capacitor is charged to a value greater than a predetermined value and to adopt the other stable state when the capacitor is charged to a value less than said predetermined value and means capable of automatically interrupting the control operation of the comparator means when said two-state device assumes its other stable state more than a fixed number of times in a predetermined period of time.

2. Synchronising apparatus according to claim 1, wherein said means capable of interrupting said control operation includes another capacitor which becomes partially charged when said two-state device assumes said other state, and relay means capable of automatically interrupting the control operation of said comparator means when said other capacitor becomes charged to more than a predetermined value.

3. Synchronising apparatus for synchronising a receiver to a transmitter in a synchronous transmission system including a control device to deliver a control frequency to the receiver, means for modifying said control frequency, comparator means to compare the received signals and control frequency and to control the modifying means to maintain the receiver in synchronism with the transmitter, a capacitor, means for feeding a part of each received pulse to said capacitor during a predetermined time interval, the resultant charge on the capacitor being indicative of the amount by which the received pulse has been disturbed, a two-input bistable device, means for applying the positive discharge pulses of said capacitor to one input of said bistable device to cause it to assume one of its stable states when the capacitor is charged to a value greater than a predetermined value and means for applying a pulse to the other input of said bistable device to cause it to assume the other of its bistable states when the capacitor is charged to a value less than said predetermined value, a first output of said bistable device connected to one input of a first AND gating device to render said gating device operable when said bistable device assumes its one stable state, a second output of said bistable device connected to the one input of a second AND gating device to render it operable when said bistable device assumes its other stable state, pulse means connected to the other input of said first and second gating device to cause the one rendered operable to supply an output pulse to another two-input bistable device to cause it to be in its one state when said first gating device is rendered operable and to switch to its other state when said second gating device is rendered operable, said first-mentioned bistable device returning to its one stable state after the respective gating device has given an output, another capacitor, means for supplying a charging voltage to said other capacitor to partially charge it when said other bistable device changes from its one state to its other state and relay means capable of interrupting the control operation of said comparator means when said other capacitor becomes charged to more than a predetermined value.

4. Synchronising apparatus according to claim 3, wherein said other capacitor is shunted by a discharge resistor and the time constant of the capacitor-resistor circuit determines the frequency of application of charging voltage necessary for the other capacitor to charge to said predetermined value.

5. A synchronous transmission system including a transmitter, a receiver and synchronous apparatus for synchronising the receiver to the transmitter comprising a control device to deliver a control frequency to the receiver, means for modifying said control frequency, comparator means to compare the received signals and control frequency and to control the modifying means to maintain the receiver in synchronism with the transmitter, a capacitor, means for feeding a part of each received pulse to said capacitor during a predetermined time interval, the resultant charge on the capacitor being indicative of the amount by which the received pulse has been disturbed, a two-input bistable device, means for applying the positive discharge pulses of said capacitor to one input of said bistable device to cause it to assume one of its stable states when the capacitor is charged to a value greater than a predetermined value and means for applying a pulse to the other input of said bistable device to cause it to assume the other of its bistable states when the capacitor is charged to a value less than said predetermined value, a first output of said bistable device connected to one input of a first AND gating device to render said gating device operable when said bistable device assumes its one stable state, a second output of said bistable device connected to the one input of a second AND gating device to render it operable when said bistable device assumes its other stable state, pulse means connected to the other input of said first and second gating device to cause the one rendered operable to supply an output pulse to another two-input bistable device to cause it to be in its one state when said first gating device is rendered operable and to switch to its other state when said second gating device is rendered operable, said first-mentioned bistable device returning to its one stable state after the respective gating device has given an output, another capacitor, means for supplying a charging voltage to said other capacitor to partially charge it when said other bistable device changes from its one state to its other state and relay means capable of interrupting the control operation of said comparator means when said other capacitor becomes charged to more than a predetermined value.

6. A receiving system including a receiver capable of receiving signals from a transmitter in a synchronous transmission system, and synchronising apparatus for synchronising the receiver to the transmitter, comprising a control device to deliver a control frequency to the receiver, means for modifying said control frequency, comparator means to compare the received signals and control frequency and to control the modifying means to maintain the receiver in synchronism with the transmitter, a capacitor, means for feeding a part of each received pulse to said capacitor during a predetermined time interval, the resultant charge on the capacitor being indicative of the amount by which the received pulse has been disturbed, a two-input bistable device, means for applying the positive discharge pulses of said capacitor to one input of said bistable device to cause it to assume one of its stable states when the capacitor is charged to a value greater than a predetermined value and means for applying a pulse to the other input of said bistable device to cause it to assume the other of its bistable states when the capacitor is charged to a value less than said predetermined value, a first output of said bistable device connected to one input of a first AND gating device to render said gating device operable when said bistable device assumes its one stable state, a second output of said bistable device connected to the one input of a second AND gating device to render it operable when said bistable device assumes its other stable state, pulse means connected to the other input of said first and second gating device to cause the one rendered operable to supply an output pulse to another two-input bistable device to cause it to be in its one state when said first gating device is rendered operable and to switch to its other state when said second gating device is rendered operable, said first-mentioned bistable device returning to its one stable state after the respective gating device has given an output, another capacitor, means for supplying a charging voltage to said other capacitor to partially charge it when said other bistable device changes from its one state to its other state and relay means capable of interrupting the control operation of said comparator means when said other capacitor becomes charged to more than a predetermined value.

7. A synchronising apparatus for synchronising a receiver to a transmitter in a synchronous transmission system, which comprises means for producing periodic control signals, means for comparing the phase of the received signals with the phase of the control signals, means operable by the said control signals to synchronise the receiver and transmitter, means for modifying the frequency of said control signals when they are out of phase synchronism with the received signals, means for detecting any disturbance of the received signals, and interrupting the modifying operation when the received signals are disturbed by more than a predetermined amount.

8. A synchronising apparatus for synchronising a receiver to a transmitter in a synchronous transmission system which comprises in cans for synchronising information received by the receiver, means for producing periodic control signals, means for comparing the phase of the received signals with the phase of the control signals, means whereby said control signals are employed to synchronise the receiver and transmitter, means for modifying the frequency of said control signals when they are out of phase synchronism with the received signals, means for detecting any disturbance of the received signals, and means whereby the modifying operation is interrupted when the received signals are disturbed by more than a predetermined amount.

9. A synchronising apparatus for synchronising a receiver to a transmitter in a synchronous transmission system which comprises means for synchronising signals transmitted with the transmitted message and for producing control signals, means for comparing the phase of the synchronising signals received by the receiver with the phase of the control signals, means whereby said control signals are employed to synchronise the receiver and transmitter, means for modifying the frequency of said control signals when they are out of phase synchronism with the received synchronising signals, means for detecting any disturbance of the received signals, and means for automatically interrupting the modifying operation when the received signals are disturbed by more than a predetermined amount.

10. A synchronising apparatus for synchronising a receiver to a transmitter in a synchronous transmisison system which comprises means whereby synchronising signals derived by the receiver from the message information including the production of periodic control signals, means for comparing the phase of the synchronising signals with the phase of the control signals, means whereby the receiver and transmitter are synchronised by the said control signals, means for modifying the frequency of said control signals when they are out of phase synchronism with the synchronising signals, means for detecting any disturbance of said synchronising signals, and means for automatically interrupting the modifying operation when said synchronising signals indicate that said information pulses are disturbed by more than a predetermined amount.

11. A synchronising apparatus as claimed in claim 10, wherein said predetermined amount represents a phase displacement of $\pi/2$ radians.

References Cited in the file of this patent

UNITED STATES PATENTS 2,575,268 Griffith ---------------- Nov. 13, 1951